Figure 1:
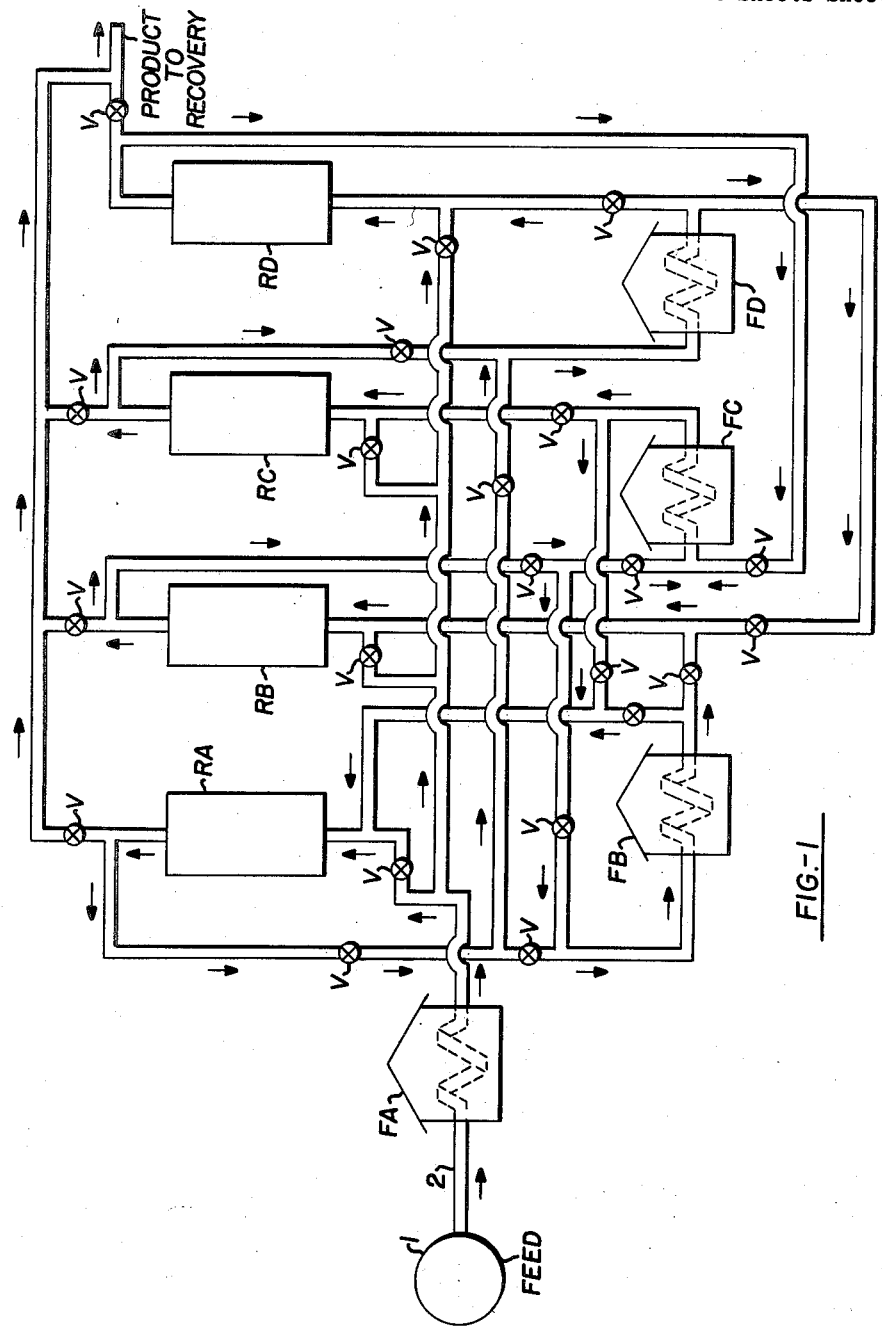

Dec. 9, 1958   R. W. SAGE   2,863,822
HYDROFORMING USING A SERIES OF REACTORS
Filed April 26, 1955   2 Sheets-Sheet 1

Richard W. Sage   Inventor

By J. Cashman   Attorney

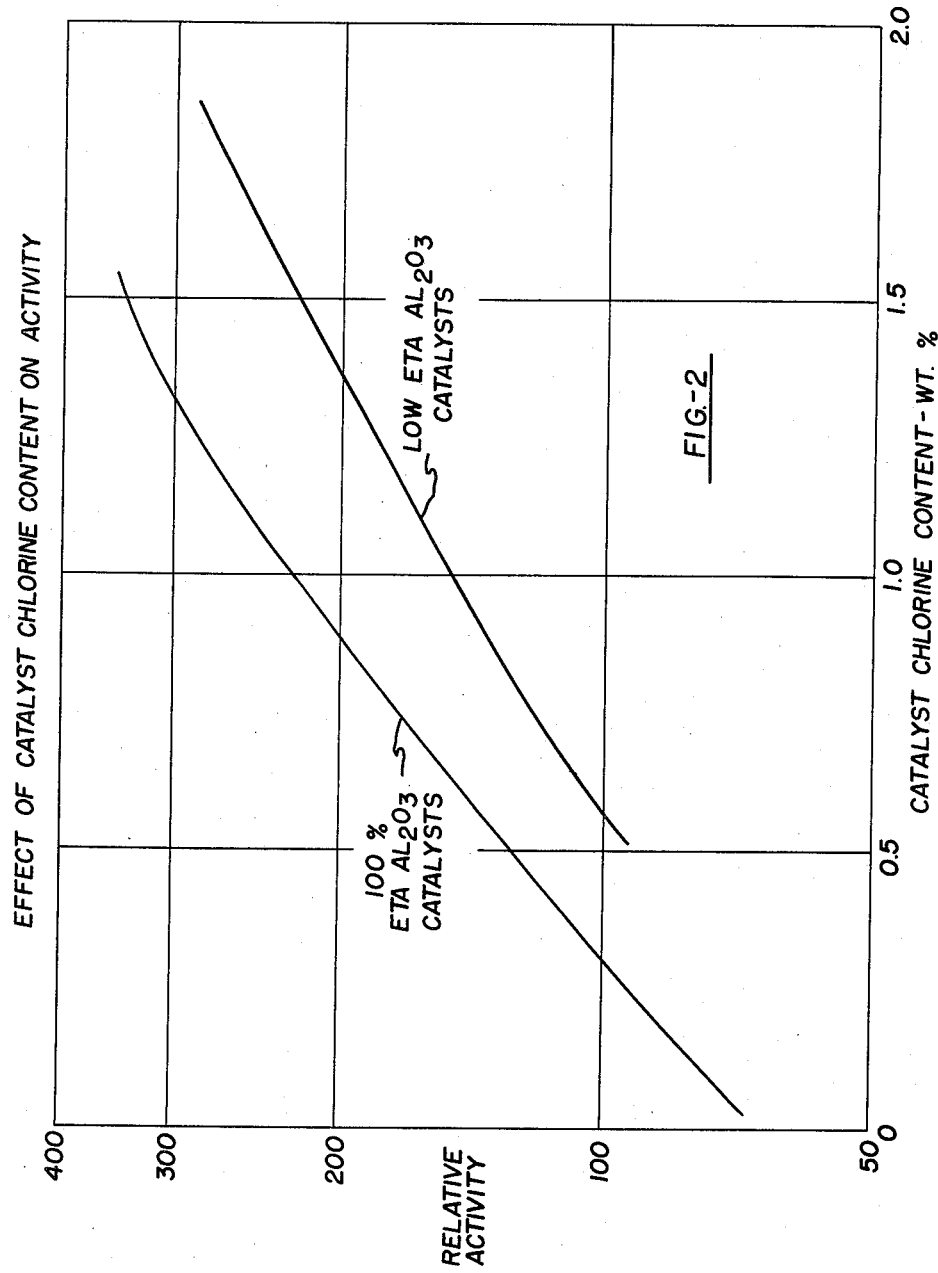

2,863,822
Patented Dec. 9, 1958

2,863,822

HYDROFORMING USING A SERIES OF REACTORS

Richard W. Sage, Fanwood, N. J., assignor to Esso Research and Engineering Company, a corporation of Delaware Application April 26, 1955, Serial No. 503,989

8 Claims. (Cl. 208—65)

The present invention relates to improvements in hydroforming. More particularly, the present invention relates to improvements in hydroforming naphtha in the presence of a platinum group metal catalyst containing halogen in a non-regenerative type of operation comprising several steps or stages with reheating between said stages, characterized in that the process is so operated as to maximize the average halogen content of the catalyst in the several stages and to provide the highest halogen content catalyst in that part of the system where high halogen content of the catalyst is required.

Hydroforming is an operation in which a naphtha, either a virgin naphtha, a cracked naphtha, a Fischer naphtha or a mixture of these is contacted at elevated temperatures and pressures with a solid catalytic material in the presence of added hydrogen. The process is so operated as not to consume hydrogen, and generally, the process results in a net production of hydrogen which, of course, becomes available in an oil refinery for hydrodesulfurizing oils, saturating olefins and similar processes.

Hydroforming processes may be divided into two general classes, namely, the non-regenerative type of operation and the regenerative type of operation. In the non-regenerative type of operation the catalyst is utilized continuously in the process for an extended period of time up to, say, 4–6 months, following which the catalyst is either regenerated or replaced by fresh catalyst while the plant is off-stream.

In contradistinction thereto, in the regenerative type of operation, the catalyst is frequently regenerated, necessitating either a reduction in plant throughput or output capacity during regeneration, or the provision of spare or standby reactors to be employed during such regeneration periods. During regeneration, the catalyst is treated with a regeneration gas, usually containing oxygen, whereupon carbonaceous deposits are consumed by burning.

In the non-regenerative process, it is necessary to operate at relatively high pressures in order to retard the deposition of carbonaceous and other deactivating bodies on the catalyst for, of course, such depositions seriously impair the activity of the catalyst. Consequently, pressures of from 400 to 800 p. s. i. g., as well as the use of large quantities of so-called recycle gas, i. e., a hydrogen-containing gas obtained from the product recovery system and returned to the reaction zone, have been proposed and used commercially in operating the non-regenerative hydroforming process. In this type of process the catalyst usually contains the expensive platinum. A good catalyst is one which contains from about 0.5–2% platinum based on the total weight of catalyst carried on an active form of alumina, preferably, the so-called eta form.

The catalyst should also contain a small amount of halogen, say, from 0.2 to 2.0% by weight of the total catalyst composition, of chlorine.

Experiments have shown that this chlorine increases the activity of the catalyst by promoting hydrocracking and permits the use of a smaller percentage of platinum to provide a catalyst of equal activity to that of the catalyst which is halogen-free but contains a greater percentage of platinum.

The object of the invention is to so operate a hydroforming plant comprising several reactors through which the feed oil passes in series as to cause a proper distribution of halogen on the catalyst, which catalyst is disposed in the several reactors in the form of fixed beds.

In brief compass, the present invention resides in the concept of employing a platinum group metal catalyst disposed in a plurality of reactors in the form of fixed beds through which the feed oil and hydrogen passes in series with reheating between reactors, and rotating periodically each of the reactors into the lead position so that the catalyst in the reactor in said position acquires halogen from the feed oil and/or the recycle hydrogen-containing gas to compensate for the halogen lost when the said reactor is not in the lead position. The halogen which is usually a chlorine-containing substance is a natural constituent of many virgin naphthas and the recycle gas invariably contains halogen and these sources of halogen give out this material to a bed of catalyst which has become deficient in halogen. It is pointed out that a halogen such as chlorine increases the hydrocracking activity of the catalyst and permits the use of less of the expensive platinum group metal within reasonable limits and the combination of platinum or palladium, plus halogen on the catalyst provides a catalyst of high activity and selectivity, and when properly employed will promote the production of high octane gasoline constituents in good yields which gasoline will also have good volatility characteristics.

In the accompanying drawings, Fig. 1 indicates, diagrammatically, an apparatus adapted to permit a multistage hydroforming process in accordance with the present improvements and Fig. 2 contains a graph drawn from original data showing the improvement obtainable in the activity of a high eta alumina-base platinum catalyst as the chlorine content of the catalyst is increased.

Referring in detail to Fig. 1, it will be noted that the plant there depicted consists of a main preheat furnace FA and three reheat furnaces FB, FC and FD. The system contains four reactors RA, RB, RC and RD through which the naphtha to be hydroformed and the recycled hydrogen gas flow in series, but in accordance with the present invention, each of the four reactors are rotated into each of the four positions shown in the drawing by manipulation of the valves V. In each of the furnaces there could be disposed two coils in a single box or case.

In operation, the naphtha to be hydroformed together with hydrogen is passed from 1 through line 2 to the first or preheat furnace FA and thereafter the feed is passed through the reactors according to the below table:

| Start | Furnace | Reactor | Furnace | Reactor | Furnace | Reactor | Furnace | Reactor | |
|---|---|---|---|---|---|---|---|---|---|
| (1) | FA to | RA to | FB to | RB to | FC to | RC to | FD to | RD | ⟶ Product recovery |
| Rotate (2) | FA to | RD to | FC to | RC to | FD to | RB to | FB to | RA | ⟶ Product recovery |
| Rotate (3) | FA to | RC to | FD to | RD to | FC to | RA to | FB to | RB | ⟶ Product recovery |
| Rotate (4) | FA to | RB to | FB to | RA to | FD to | RD to | FC to | RC | ⟶ Product recovery |

This method of rotation of the reactors is repeated after completion of the cycle of operations indicated above. By this means each reactor is rotated into each of the four positions in a complete plant or system. The main preheat furnace FA is always in the lead position because it has a higher capacity than the reheat furnaces.

The valving as shown in the drawing is adequate for it controls the direction of flow of the oil vapors and hydrogen and for the further reason that the system is not isolated for regeneration with air because the present process is of the non-regenerative type.

In Fig. 2 there is shown the effect of the chlorine content of the catalyst on its activity. This graph is based on a comparison made with a standard catalyst having a relative activity of 100. The curves show that increasing the chlorine content of the catalyst sharply increases the catalyst activity. This means that the amount of platinum in the catalyst can be reduced provided that a sufficient amount of chlorine is also present in the catalyst composition.

Analyses of the catalyst from a hydroforming operation were carried out for 2119 hours in a continuous manner under the conditions shown in Table A with the results as to chlorine distribution shown in Table B.

*Table A*

[Catalyst composition in wt. percent Pt 0.6, Eta $Al_2O_3$ 98.7, Cl 0.73 at start.]

| Reactor No. | Temp., °F. | | Press., P. s. i. g. | Oil Feed Rate, W./Hr./W. | $H_2$ Feed Rate, s. c. f./bbl. Oil Feed | Conc. of $H_2$ Mol Percent |
|---|---|---|---|---|---|---|
| | Inlet | Outlet | | | | |
| 1 | 910 | 786 | 400 | 4 | 6,000 | 85 |
| 2 | 916 | 851 | 400 | 4 | 6,000 | 85 |
| 3 | 927 | 905 | 400 | 4 | 6,000 | 85 |
| 4 | 925 | 910 | 400 | 4 | 6,000 | 85 |

It was found that after running 2119 hours, the catalyst in the several reactors had the chlorine contents shown in Table B.

*Table B*

| Reactor No. | Avg. $Cl_2$, Wt. Percent | Distribution of Chlorine in Catalyst Bed, Wt. Percent | | |
|---|---|---|---|---|
| | | Inlet | Middle | Outlet |
| 1 (Lead) | .63 | .60 | .60 | .74 |
| 2 | .41 | .29 | .42 | .51 |
| 3 | .41 | .33 | .38 | .59 |
| 4 (Tail) | .39 | .32 | .36 | .56 |

It can be seen that the average chlorine is highest in the first reactor and lowest in the fourth reactor. Furthermore, the concentration of chlorine in passing through any individual reactor is higher at the outlet than at the inlet. The chlorine content of the catalyst at the outlet of the first reactor is essentially that of the fresh catalyst. This, of course, substantiates the above statement since the average temperature in the first reactor is the lowest, and the outlet of any given reactor has a lower temperature than the inlet because of the strongly endothermic reactions occurring. Thus, it is established that the conditions are most favorable for retention of existing chlorine or absorption of additional chlorine in the initial reactor of a given train consisting of two or more reactors.

The present invention provides a means for maintaining the catalyst in all reactors at a high level of activity in a non-regenerative continuous hydroforming operation by periodically rotating each of the reactors into the lead position whereby chlorine can be absorbed by the catalyst under the favorable conditions existing at this point from the two sources which are described in the following paragraph.

The naphtha feed stock contains chlorine in most cases as a naturally occurring element in a concentration of 1–5 p. p. m. in an average West Texas naphtha. Further, the gas recycled to the reactor inlet contains gaseous chlorine, a portion of which is removed from the catalyst and another portion of which has its source in the feed and passes through the system unabsorbed.

Thus, the catalyst in the first reactor has a constant supply of chlorine from which to replenish the chlorine on the catalyst to the equilibrium level. Analyses of the catalyst after extended periods show that an equilibrium chlorine level is reached after a period of time. After reaching this level, rotation of the last reactor into the lead position will build up its chlorine content while the reactor originally in the lead position, now rotated to another position in the reaction train, can fully utilize the activity inherent due to its higher chlorine content. After a period of time the equilibrium is reestablished and it is necessary to rotate the reactors in the system again. Normally, this rotation would not be required more often than every three or four days depending upon the severity of operating conditions. However, rotation times of one month or longer would still show a substantially higher average chlorine, as indicated in Fig. 2 than operation until the catalyst was completely spent.

Chlorine entering the reaction system above described will be absorbed on the catalyst and increase its activity if the temperature, pressure, and average chlorine on catalyst are such as to favor an equilibrium condition of higher chlorine on the catalyst. In an experiment where chlorine (as $CCl_4$) was added to the feed (10–30 p. p. m.) for a short period of time, 0.28 wt. percent of chlorine was absorbed in the system before appreciable excess chlorine appeared at the exit of the unit. During this period of chlorine addition the catalyst activity increased as shown below.

First, the conditions of hydroforming were:

Use of four reactors
Feed rate of oil, 1.0 w./hr./w.
Pressure—400 p. s. i. g.
6000 s. c. f./bbl. oil of recycled $H_2$ gas
Preheat and reheat temperatures required before $Cl_2$ addition to give 98 (clear) octane number—929° F.
After $Cl_2$ addition temperature required to give 98 (clear) octane number—912° F.

Thus, it is shown that chlorine is taken up by the catalyst at the lower temperature and higher pressure which would prevail in the first reactor. It is pointed out that because of the high catalyst activity at the lower temperature of 912° F., the process possesses greater flexibility, for as activity declines with the passage of time, it is possible to increase the activity by increasing the temperature up to a maximum of about 965° F. without injury to the catalyst. Hence, beginning operations at 912° F. gives a permissible temperature range of 53° F., a 17° F. advantage over the permissible range where operations must be initiated at 929° F. This lower temperature at which the catalyst is highly active permits a longer catalyst life.

To recapitulate briefly, the present invention relates to improvements in hydroforming using a platinum group metal catalyst in a non-regenerative type of operation wherein the invention resides in the concept of rotating the reactors in a multi-stage hydroforming operation so that each of the several reactors becomes the lead reactor whereby reactors which contain catalyst deficient in halogen are replenished with respect to this important ingredient in the catalyst, the halogen being obtained by the catalyst from the fresh feed which invariably contains halogen and from the recycled hydrogen-containing gas. Of course, if it happens that the naphtha feed oil does not contain halogen, or the amount thereof is insufficient, extraneous halogen may be added to the feed in the form of, say, $CCl_4$.

As used herein, the term "gasiform" signifies the recycled hydrogen-containing gas, the vaporized feed or a mixture of the two.

In the foregoing description and the drawing, there are shown four reactors. Of course, it will be understood that the number of reactors may be varied from 2 to 6.

Numerous modifications of the invention will be made by those who are familiar with this art without departing from the spirit thereof.

What is claimed is:

1. The method of operating a non-regenerative hydroforming process employing a platinum group metal catalyst which comprises providing a plurality of reactors containing the said catalyst, causing a naphtha naturally containing halogen and a hydrogen-rich gas to flow in series through the reactors the lead reactor of said series being maintained at a temperature lower than that prevailing in the succeeding reactors and periodically changing the course of the travel path of the said naphtha and hydrogen through the reactors responsive to the activity of the catalyst in the several reactors by rotating each reactor into the lead position in the series, whereby the halogen content of the catalyst in each reactor is periodically replenished by halogen naturally contained in the feed naphtha.

2. The method set forth in claim 1 in which the highest pressure prevails in the lead reactor.

3. The method set forth in claim 1 in which the catalyst comprises eta alumina, platinum and chlorine.

4. The method of operating a non-regenerative hydroforming process employing a platinum group metal catalyst which comprises providing a system comprising a plurality of reactors containing the said catalyst, causing a naphtha naturally containing halogen and hydrogen-rich gas to flow in series through the reactors the lead reactor of said series being maintained at a temperature lower than that prevailing in the succeeding reactors, the effluent from each reactor being reheated before it enters the next succeeding reactor in the series and maintaining the catalyst at a high level of activity by periodically rotating each reactor into the lead position of the series whereby the catalyst in the reactor newly placed in the lead position has its halogen content increased by adsorption of halogen from the feed naphtha naturally containing halogen entering the system, and the reactor newly removed from the lead position in the series containing a catalyst bed highest in halogen content is rotated into a position where its higher activity is most effectively utilized.

5. The method set forth in claim 4 in which the platinum group metal catalyst is platinum.

6. The method set forth in claim 4 in which the halogen is chlorine.

7. The method set forth in claim 4 in which the catalyst comprises eta alumina, platinum and halogen.

8. The method set forth in claim 7 in which the platinum content of the catalyst is about 0.6 wt. percent in which the halogen is chlorine and is present in about 1.5 wt. percent.

References Cited in the file of this patent

UNITED STATES PATENTS

| | | |
|---|---|---|
| 2,642,384 | Cox | June 16, 1953 |
| 2,752,289 | Haensel | June 26, 1956 |

OTHER REFERENCES

"Thermal Transformation of Aluminas and Alumina Hydrates," Stumpf et al., Ind. and Eng. Chem., vol. 42 (July 1950), pages 1398 to 1403.